United States Patent [19]

Cherney

[11] Patent Number: 4,546,596
[45] Date of Patent: Oct. 15, 1985

[54] METHOD OF AND APPARATUS FOR FORMING, FILLING AND SEALING PACKAGES

[75] Inventor: Dale M. Cherney, Howards Grove, Wis.

[73] Assignee: Hayssen Manufacturing Company, Sheboygan, Wis.

[21] Appl. No.: 608,184

[22] Filed: May 8, 1984

[51] Int. Cl.⁴ .................. B65B 51/14; B65B 51/30; B65B 57/00
[52] U.S. Cl. .......................... 53/451; 53/75; 53/551; 53/373; 156/358
[58] Field of Search ............... 53/75, 551, 552, 554, 53/373, 451, 463, 477; 156/351, 380.4, 358, 380.7, 378

[56] References Cited

U.S. PATENT DOCUMENTS

| | | | |
|---|---|---|---|
| 3,925,139 | 12/1975 | Simmons | 156/358 |
| 4,040,237 | 8/1977 | O'Brien | 53/551 |
| 4,288,965 | 9/1981 | James | 53/551 X |
| 4,313,778 | 2/1982 | Mims | 156/358 |
| 4,348,851 | 9/1982 | Prakken | 53/75 |

Primary Examiner—Horace M. Culver
Attorney, Agent, or Firm—Senniger, Powers, Leavitt and Roedel

[57] ABSTRACT

Method of and apparatus for controlling a bag forming, filling and sealing machine by monitoring the machine cycle and controlling the jaw closure mechanism based on a previously determined jaw closed point. If the jaw closed indication is received prior to the previous value plus offset, the sealing cycle continues normally and all functions interlocked to jaw closed position such as knife, impulse, etc. are allowed to function normally. If the jaw closed signal is not received prior to the previous value plus offset the jaw close function is inhibited signifying a jam condition and the interlocked functions such as knife, impulse, etc. are inhibited. This function is independent of any external adjustment and serves as a safety device in all modes.

7 Claims, 15 Drawing Figures

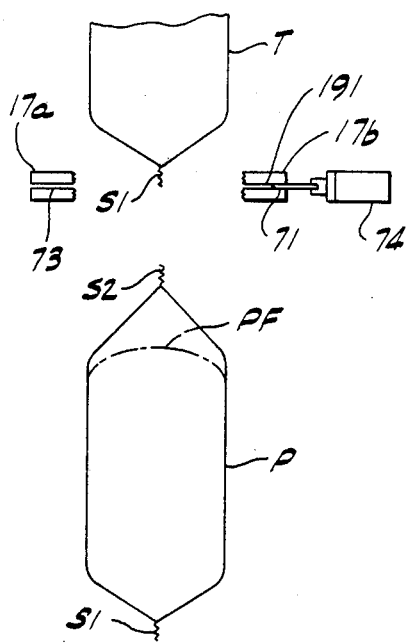
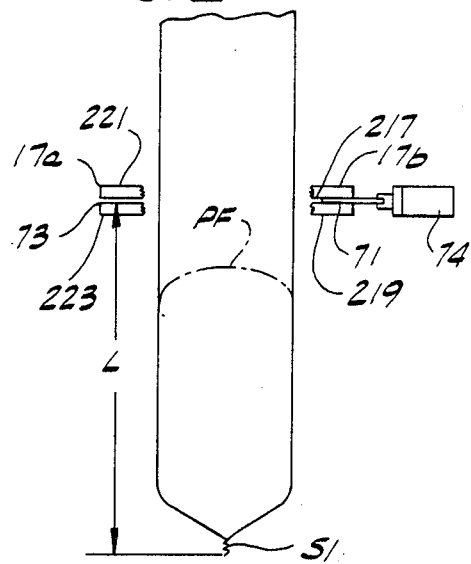
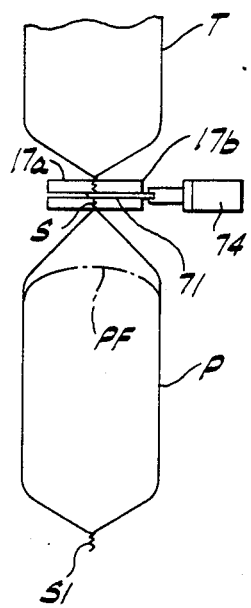
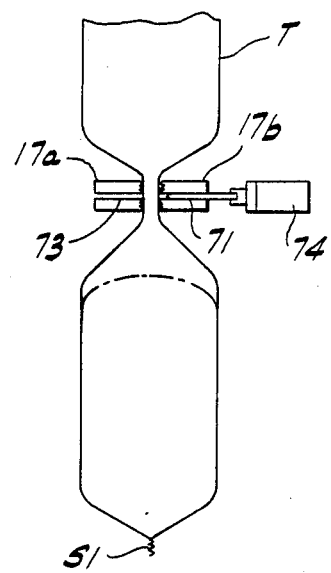
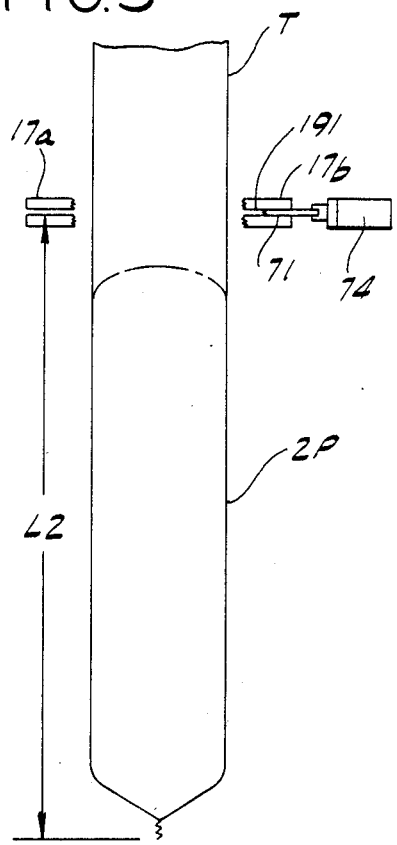

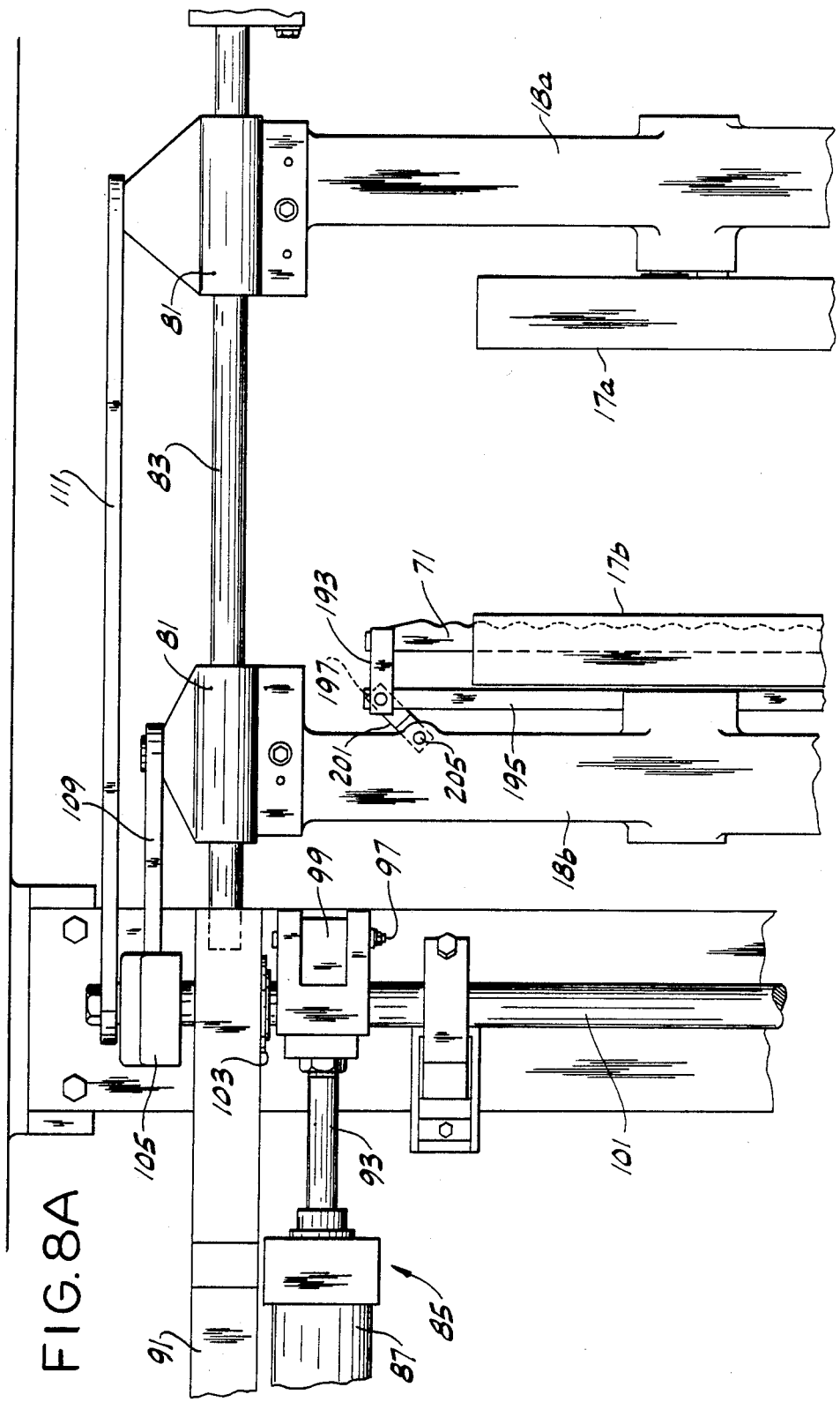

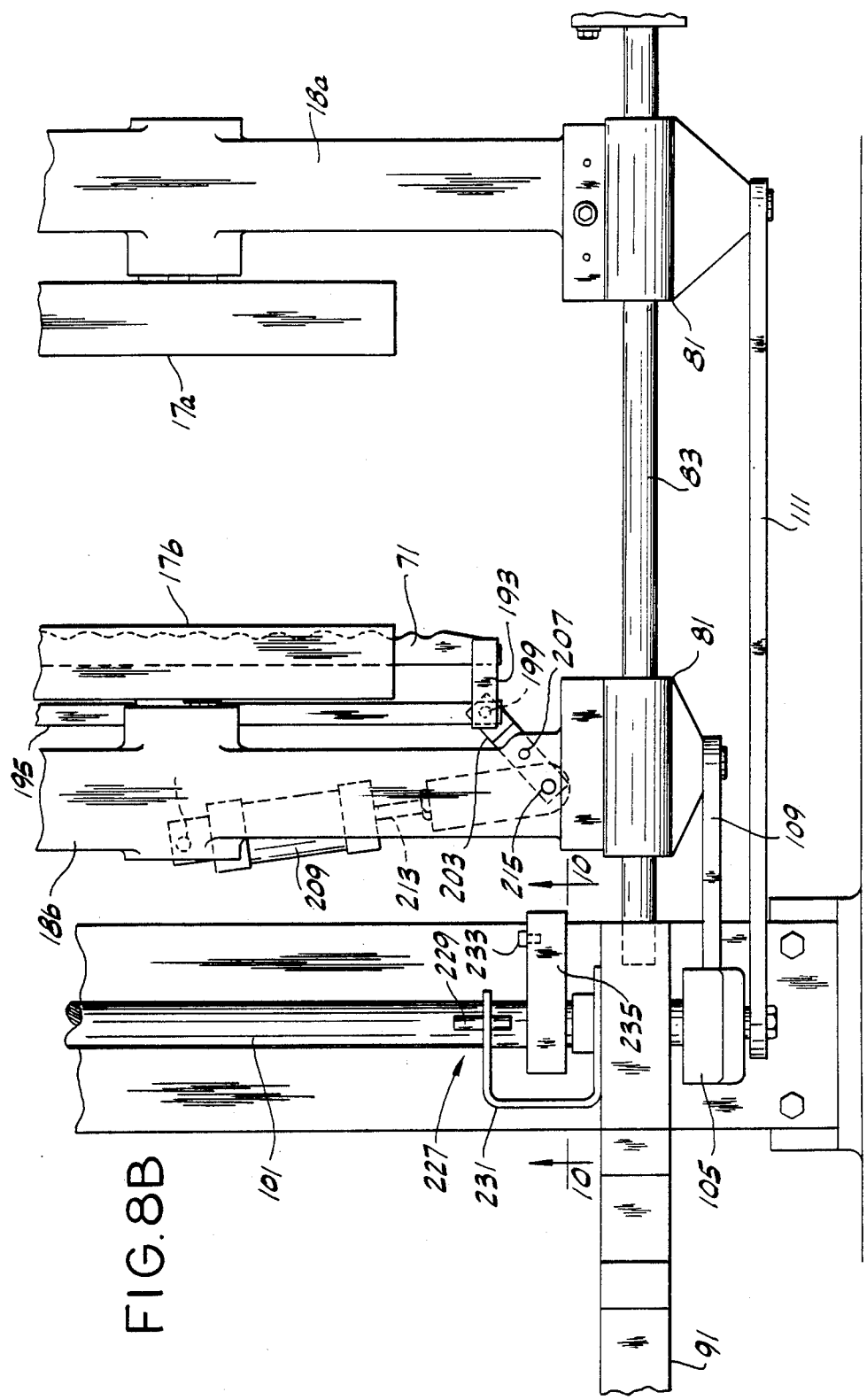

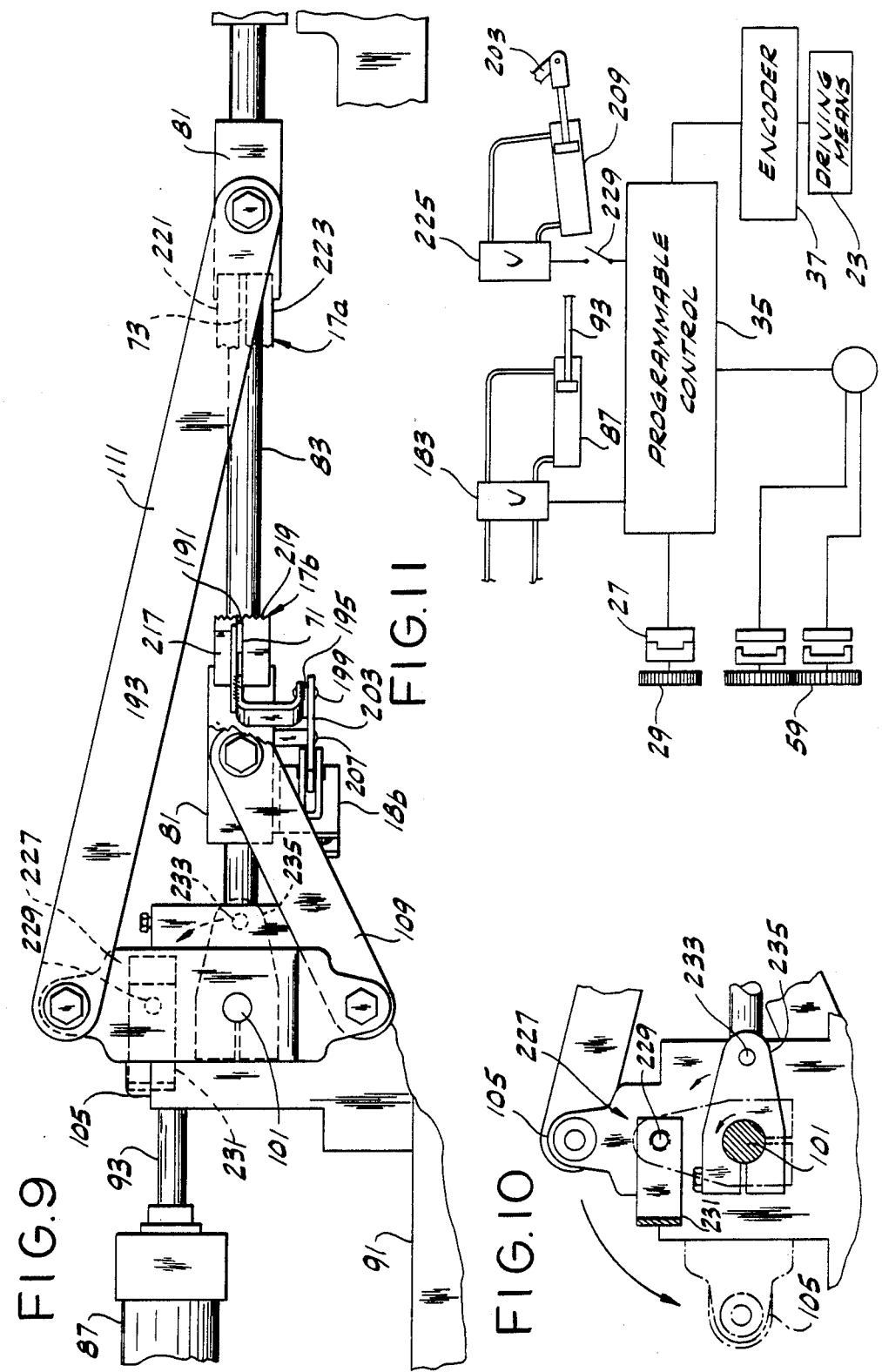

METHOD OF AND APPARATUS FOR FORMING, FILLING AND SEALING PACKAGES

BACKGROUND OF THE INVENTION

This invention relates to a method of and apparatus for controlling machinery capable of forming, filling and sealing packages, and more particularly, control of sealing and cutting functions of such machinery.

Package forming, filling and sealing machinery of the type, for example, in which flexible packaging material is formed into tubing, and heat-sealed at package length intervals by means of a pair of sealing members or jaws to cut the tubing at each seal to provide a trailing or upper end seal for each package being completed and a leading or lower end seal for the next package, have been known for many years.

Functions such as knife motion and impulse control in these machines have been under the control of a limit switch mounted in the jaw area which sensed actual closure of the jaw assembly, thus enabling the function only if the dies were securely closed. This action prevented a function such as a knife from operating if the jaws were not closed.

For years, many attempts have been made at designing and perfecting a jam detection scheme to prevent injury to the operator or damage to the sealing surfaces should product being packaged or other foreign object get caught in the sealing area. All these schemes involved forming a "window" with a cam or other timing device which required the jaws to be closed at a certain point in the machine cycle or the jaws would open in the event of a jam. Unfortunately, the system was unreliable for several reasons.

For example, as the system went from a cold start to normal ambient operating conditions, the jaw closed point in machine degrees shifted so the jaws closed point occurred earlier in the cycle, thus requiring the "window" to be moved a corresponding amount earlier to still provide protection. This was a nuisance and operators typically moved the window very late in the cycle, thus defeating the purpose of the detector.

Also, the system had to be adjusted for each bag size and was simply regarded as a nuisance adjustment. Further, since the jaw close function is pneumatic in nature, the settings would not repeat due to regulator adjustments or air pressure variations, again causing the system to run with an oversized "window" to compensate for system constraints. In addition, timing could be adjusted in terms of start and stop initiation points, but since the jaw closed point was not directly linked to the machine motion for the reasons cited above, the jaw closed point in machine degrees was unknown. This affected the quality of end seals due to inconsistent jaw closed duration.

SUMMARY OF THE INVENTION

Accordingly, among the several objects of this invention may be noted the provision of an improved method of and apparatus for controlling machinery for forming, filling and sealing packages, as described, which eliminates the above-described difficulties and disadvantages associated with prior art devices, and which does so in an efficient and economical manner.

In general, the method of the present invention involves the monitoring of certain machine functions and the point of occurrence of those functions with respect to the total machine cycle and predetermined points within that cycle and utilization of that information to control various machine functions. In machinery of the general type to which the present invention pertains, a sheet of flexible packaging material is formed into a tube, commonly in a vertical position, the tube is then filled, sealed and cut in a sequential manner to form individual packages of product in a well known way. The tube is moved intermittently and each intermittent movement forms a package and constitutes a single complete cycle for the machinery. At some point in the cycle the sealing members are brought into engagement with the tubing to simultaneously produce upper and lower seals for adjacent packages to be formed from the tubing. Subsequent to the closing of the sealing members or jaws a cutting member or knife severs the tubing between the adjacent packages being formed so that the previously filled package can fall away and the subsequent package may be filled.

In the present invention, the point of complete closure of the sealing members is monitored and compared to a predetermined position in the previous machine operating cycle in order to determine whether or not the sealing operation is initiated at the proper point in the cycle. If it is, closing of the jaws continues until complete, if not, the movement of the jaws is inhibited and they are returned to the initial open position. Likewise, the point of complete closure of the sealing members or jaws is monitored and compared to the same predetermined position in the machine cycle. If the point of closure is prior to the predetermined position in the machine cycle, the knife is actuated to sever the flexible tubing in the area of the seal. If the point of closure is beyond the predetermined position in the machine cycle, the knife is not actuated, the jaws are opened and a subsequent cycle continues.

To accomplish the above method the apparatus of the present invention includes means such as an optical encoder or the like which is utilized to establish the point of complete closure in machine degrees of the sealing members or jaws and proximity switch or the like to determine the point of complete closure of them. The information obtained is fed to a microprocessor or other control unit which then compares the position of the previous occurrence with the current machine cycle which it is monitoring and with predetermined points within that cycle, as mentioned above, to effect movement or actuation of the cutting means or knife or to inhibit the same.

Other objects and features will be in part apparent and in part pointed out hereinafter.

BRIEF DESCRIPTION OF THE DRAWINGS

FIG. 1–3 are diagrammatic views illustrating the forming, filling and sealing of a package involving the downfeed of a package length of tubing between a pair of sealing jaws, the delivery of product, and the closure of the jaws to form a transverse seal across the tubing, showing the knife for cutting the tubing, and illustrating in FIG. 1 a package, which has been cut off by the knife, dropping away;

FIG. 4 is a diagrammatic view illustrating product trapped in the tubing between the jaws, preventing complete closure of the jaws and thus preventing formation of a seal, FIG. 5 is a diagrammatic view illustrating the sequence of operations in accordance with this invention on incomplete closure of the jaws, involving retraction of the jaws without formation of a seal by the jaws and downfeed of another package length increment of the tubing, resulting in a double-length package;

FIGS. 8A and 8B together constitute a plan view, with parts broken away, of the sealing jaw and knife actuating mechanism of the machine, showing the sealing jaws in their open position and the knife in its retracted position in one of the jaws;

FIG. 9 is a side elevation of the FIG. 8A, B mechanism again showing the sealing jaws in their open position and the knife in its retracted position in said one jaw;

FIG. 10 is a view in vertical section on line 10—10 of FIG. 8B showing in solid lines the position of certain parts when the jaws are open and in phantom the position of said parts when the jaws are closed on the tubing to form a seal;

FIG. 11 is a control circuit diagram;

Corresponding reference characters indicate corresponding parts throughout the several views of the drawings.

DESCRIPTION OF THE PREFERRED EMBODIMENT

Figure 6:
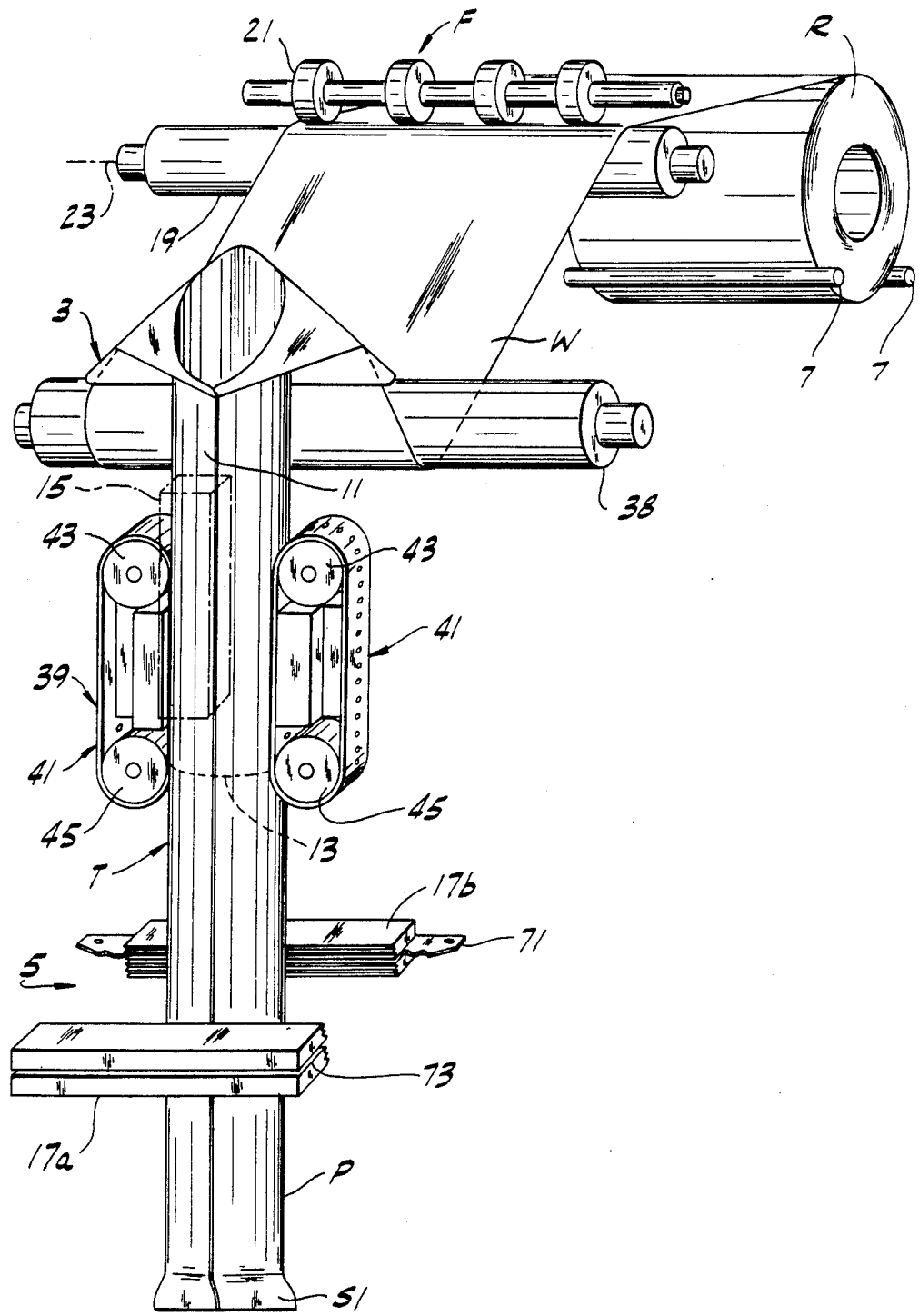
FIG. 6 is a perspective of a vertical form-fill-seal machine of the type in which the invention is incorporated.

Referring first to FIGS. 1–5 of the drawings, the invention is shown as it relates to the forming, filling and sealing of packages involving the forming of flexible packaging material, for example a single web of flexible packaging material, into tubing designated T, with the tubing extending downwardly, the tubing being intermittently fed downwardly and transversely heat sealed at package length intervals L, a quantity of the product with which the packages are to be filled being delivered into the lower end of the tubing to provide a fill for each package during the intervals between successive sealing operations.

As herein illustrated, the forming, feeding and sealing of the tubing may be carried out by means of vertical form-fill-seal apparatus of the type such as shown in the co-assigned U.S. patent of Robert C. James, U.S. Pat. No. 4,288,965, issued Sept. 15, 1981, involving a pair of heat sealing members, more particularly a pair of heat sealing jaws, intermittently movable in and out in a fixed horizontal plane between an open position and a closed position in sealing engagement with the tubing for forming a transverse seal S across the tubing. However, it is to be understood that broadly considered, these operations may be carried out by means of other types of vertical form-fill-seal apparatus including, for example, apparatus of the type in which the sealing jaws are movable up and down, closing on the tubing at the top of their stroke and pulling down a package length increment of the tubing, the sealing jaws then opening and moving up to the top of their stroke, so as to provide a package length increment of the tubing extending down from the sealing jaws at the top of their stroke.

FIGS. 1–3 illustrate the method as it relates to the type of operation in which the heat sealing members or jaws, which are designated 17a and 17b, operate in a fixed generally horizontal plane, being movable relative to one another toward and away from one another between an open position (FIGS. 1 and 2) spaced apart a distance somewhat greater than the diameter of the tubing T and a closed position (FIG. 3) in sealing engagement with the tubing for forming the transverse seal at S. Jaw 17a has a knife 71 associated therewith adapted to be driven into a slot 73 in the other jaw 17b when the jaws have closed (by means of an air cylinder 74) for transversely cutting the tubing through the seal S, forming the trailing or upper end seal S2 for the package being completed and the leading or lower end seal S1 for the next package to be formed.

FIG. 1 illustrates the sealing members 17a and 17b open at the end of one forming, filling and sealing cycle and the beginning of the next cycle. As shown therein, a completed package P is dropping away. The lower end of tubing T, sealed as indicated at S1, is at the level of the sealing jaws. The tubing T is fed downwardly between the sealing members one package length increment, i.e., to the point where its lower end is one package length L below the level of the sealing members as shown in FIG. 2. A measured quantity of the product with which the package is to be filled is delivered into the tubing from above (as is conventional in vertical form-fill-seal operations) and drops down in the tubing to the lower end of the tubing. The stated quantity of the product, which may be referred to as the package fill, is indicated at PF.

The sealing members 17a and 17b are then closed as shown in FIG. 3 to form the next seal S comprising the top (trailing) seal S2 for the package P being completed and the bottom (leading) seal S1 at the lower end of tubing T for the next package to be formed. With the sealing members closed, the knife 71 is actuated to cut through the tubing between the seals S2 and S1 to sever the completed package from the tubing. The sealing members 17a and 17b are then opened, and the completed package P drops away, as illustrated in FIG. 1.

In accordance with this invention, the movement of the sealing members or jaws 17a, 17b from the open position of FIGS. 1 and 2 to the closed position of FIG. 3 in sealing engagement with the tubing is sensed in a manner to be described and in the absence of sensing movement of the sealing members to closed position, cutting is inhibited. FIG. 4 illustrates the situation in which the sealing members or jaws 17a, 17b do not complete their movement to the closed position of FIG. 3 on account of product being trapped in the tubing T between the sealing members and thus fail to make a seal. Under these circumstances, the sealing members are opened (see FIG. 5) and the tubing T is fed downwardly between the sealing members another package length increment (carrying on with the cycle) but, as a result of no seal having been made and cutting having been inhibited, a length of tubing designated L2, double the package length L, extends down below the level of the sealing members, as shown in FIG. 5. On the next operation of the sealing members, assuming they close all the way, this double length is sealed, and cut, forming a double-length package 2P which on subsequent opening of the sealing members drops away, and which, generally, is thrown away.

Figure 7:
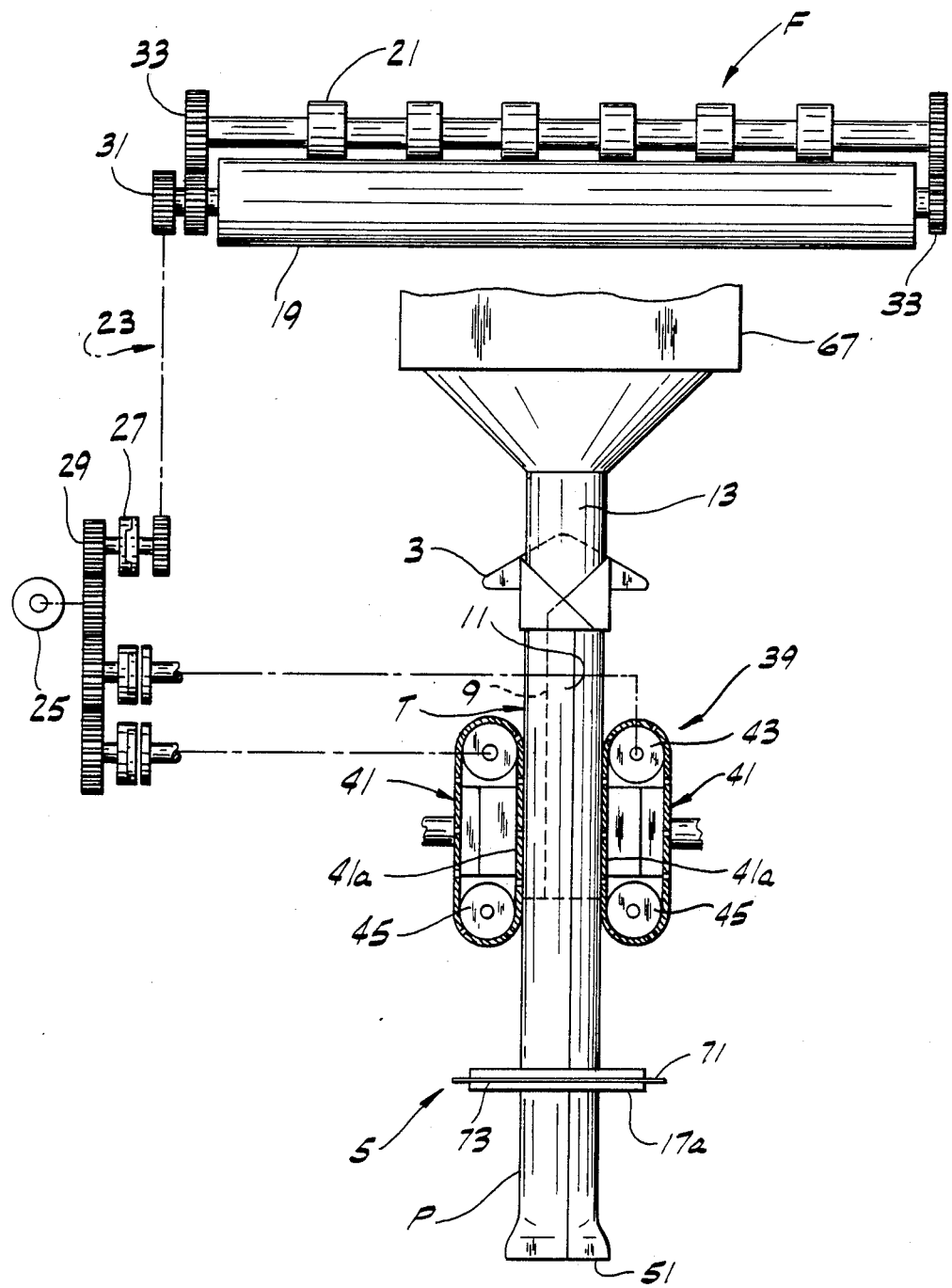
FIG. 7 is a front elevation of FIG. 6, showing certain drive mechanism of the machine.

Now referring to FIGS. 6 and 7, the invention is shown as incorporated in a vertical form-fill-seal apparatus such as shown in the aforesaid coassigned U.S. Pat. No. 4,288,965 and in the coassigned U.S. Pat. No. 4,391,081 wherein a web W of flexible packaging material is pulled from a supply, fed over means 3 for forming the web into the tubing T, product to be packaged is provided in the tubing, and sealing operations are performed on the tubing as generally indicated at S (see FIG. 3) to seal it to form packages. The packaging material may be low density polyethylene film, for example, and the supply may be constituted by a roll R of the film suitably supported as indicated at 7. The forming means 3 may be a forming shoulder generally of a conventional type such as shown, for example, in the coassigned U.S. Pat. Nos. 3,050,906 issued Aug. 28, 1962, 3,449,888 June 17, 1969, and 3,664,086 issued May 23, 1972.

As shown in FIGS. 6 and 7, the forming shoulder 3 forms the web W of packaging material into the tubing T with the longitudinal margins 9 and 11 of the Web W in lapping relationship, and directs the tubing downwardly around a vertically extending, hollow mandrel 13. As illustrated, margin 9 is on the inside, margin 11 on the outside. At 15 in FIG. 6 is diagrammatically indicated suitable means for sealing the lapping margins 9 and 11 of the web to form a longitudinal seam for the tubing. Product is provided in the tubing T via the hollow mandrel 13 in suitable conventional manner, and the tubing is transversely heat sealed at package length intervals by the heat sealing jaws or bars 17a and 17b at 5 below the lower end of the mandrel.

The sealing jaws or bars are operable in a fixed horizontal plane below the lower end of the mandrel to form the top seal S2 for the package being completed and the bottom seal S1 for the next package to be formed. One of the seal bars, namely bar 17b, carries the knife 71 and the other, 17a, has the slot 73 receiving the knife for cutting transversely between the seals made at 5 to separate the completed package P from the tubing. The tubing is generally intermittently fed downward one package length increment, the jaws being open. The tubing dwells between successive feed cycles, the jaws being closed on the tubing for the transverse sealing operation during each dwell.

The web W is intermittently pulled from supply roll R, measured for each sealing operation at 5, and fed forward toward the forming shoulder 3 by means indicated generally at F located between the supply roll and the forming shoulder. This means F is intermittently operable to feed the web forward one packge length increment in a given interval, acting as a web feeding and measuring or metering means. As illustrated, it comprises a lower roll 19 and an upper roll 21 with means indicated generally at 23 for intermittently driving these rolls through a predetermined interval corresponding to the desired length for the packages to be formed to feed the web forward one such increment.

As shown in FIG. 7, the driving means 23 comprises a continuously operating electric motor/speed reducer unit 25 driving the input of an electric clutch/brake unit 27 via gearing indicated at 29, the output of the clutch/brake unit being connected to the lower roll 19 as indicated at 31. The rolls 19 and 21 are geared together as indicated at 33. The clutch of unit 27 is adapted intermittently to be engaged and the brake of unit 27 disengaged for driving the rolls 19 and 21.

The driving means 23 feeds forward the requisite package length increment of web W on each feed cycle and is controlled by a suitable programmable control 35 (such as a microprocessor, for example, a 6502 microprocessor obtainable from Rockwell International Corp.) which receives input from an encoder 37 monitoring the machine cycle through connection with the driving means 23, or other appropriate portion of the machine which permits constant monitoring of the machine cycle (see FIG. 11). The web W travels from the measuring and feeding rolls 19 and 21 under a guide roll 38 and thence up to and around forming shoulder 3. The increment of the web W fed forward by the measuring and feeding rolls 19 and 21 is taken up and pulled over the forming shoulder 3 under tension by tubing feeding means indicated generally at 39 in FIGS. 6 and 7 below the forming shoulder.

The tubing feeding means 39, as illustrated, comprises a pair of endless belts, and more particularly a pair of vacuum belts each designated 41 at opposite sides of the mandrel 13 (for vacuum gripping the tubing to feed it downward). Each belt is a flat belt trained around an upper pulley 43 and a lower pulley 45 and so arranged as to have a downwardly movable inner reach 41a engageable with the tubing T at the respective side of the mandrel 13. The belts 41 pull the tubing T down over the mandrel 13 in a well known manner, for example, as described in U.S. Pat. No. 4,288,965.

In the operation of the apparatus of FIGS. 6 and 7, the tubing feeding means 39 is actuated in timed relation to a function of the apparatus, such as the filling function, the encoder 37 being operable to signal the programmable control 35 to actuate the tubing feeding means 39 to start driving rolls 19 and 21 to unwind the web W from the supply roll R and feed it forward at the appropriate time, e.g., when a scale (or other feed system) such as indicated diagrammatically at 67 in FIG. 7 has weighed out the quantity of product (a "fill") to be delivered for a package, and has dumped the product for delivery down through the mandrel 13 into the tubing T.

The tubing feeding means 39 remains actuated for an interval such as to cause rotation of the rolls 19 and 21 to feed forward a package length increment of the web, and is then deactuated. The interval may be determined and controlled via the programmable controller 35 or by means of an optical scanning system operating in conjunction with registration marks at package length intervals on the web in the case of preprinted web, or by means measuring the rotation of the rolls 19 and 21 in the case of unprinted web, or in other suitable manner well known in the art, for example, as is disclosed in U.S. Pat. No. 4,391,079.

At the start of the downward feed of the tubing T, the sealing jaws or bars 17a and 17b are open, and remain open throughout the downward feed of the tubing off the lower end of the mandrel 13. With the tubing T stopped, and with a fill PF in the tubing above the transverse seal S1 at the lower end of the tubing (this seal being one package length below the sealing jaws and constituting the bottom seal for the package to be completed) the jaws are closed on the tubing to form the top seal S2 for the package P being completed and the bottom seal S2 for the next package to be formed. The jaws then open, and rolls 19 and 21 and belts 41 are operated through the next feed cycle.

As shown in FIGS. 8A and B and 9, the sealing jaws or bars 17a and 17b are carried by carriers 18a and 18b, respectively, each of which is mounted for movement transversely of its length in a horizontal plane by means of a pair of tubular slides 81 at its ends slidable on a pair of slide guide rods 83 extending horizontally parallel to one another at opposite sides of the apparatus. Means indicated generally at 85 is provided for sliding the carriers carrying the sealing jaws back and forth on the rods toward and away from each other, this means being shown to comprise an air cylinder 87 pivoted at its tail end on frame structure 91 of the apparatus, and having its piston rod 93 extending from its piston through its head end to a pin connection at 97 with a crank 99 on an oscillatory cross-shaft 101 journalled in bearings 103 in the frame structure.

Shaft 101 has a double crank 105 at each of its ends, each crank 105 having its lower end connected to the slides 81 for one of the jaw carriers by links 109, and its upper end connected to the slides 81 for the other jaw carrier by links 111. The arrangement is such that on extension of the piston rod 93 from the cylinder 87, the sealing jaws 17a and 17b are moved away from each other, and on retraction of the piston rod the jaws are moved toward each other.

The air cylinder 87 for actuating the sealing jaws 17a and 17b is under control of a suitable air valve 183 which is in turn under control of the programmable control 35, as illustrated in FIG. 11. When the scale 67 has weighed out the quantity of product (the "fill") to be delivered for a package, and has dumped the product for delivery down through the mandrel 13 into the tubing T, control 35 transmits a signal to set the valve 183 for actuating the cylinder 87 to retract its piston rod 93 to close the sealing jaws.

Control 35 also compares the point of complete closure of the sealing members with a known previous cycle position, in the machine cycle. If the point of closure is prior to the previous cycle +10°, position control 35 permits valve 183 to continue to close the sealing jaws. If the point of closure extends beyond the previous cycle closure +10°, valve 183 is deactivated to stop closure of the sealing jaws. The valve is subsequently set to effect extension of the piston rod to bring the jaws 17a and 17b back to their open position.

A cycle of operation of the apparatus may be regarded as starting wih the sealing jaws 17a and 17b open, the lower end of the tubing T having an S1 seal in the horizontal plane of the sealing jaws as shown in FIG. 1. A completed package P with an S2 seal at the top is dropping away. Generally, product for the next package fill has been and is being delivered to the lower end of the tubing T, being held in by the seal S1.

Under control of the programmable control 35, a package length L of the tubing T is fed down between the open sealing jaws 17a and 17b (FIG. 2). Valve 183 is then actuated to cause the sealing jaws 17a and 17b to close upon the tubing T. Assuming everything is in order, the sealing jaws 17a and 17b complete their closure to form the next seal as illustrated in FIG. 3, and the knife 71 is actuated to cut through the tubing between the seals S2 and S1 to sever the completed package P from the tubing. Valve 183 is then deactivated by control 35 to cause the sealing jaws to open.

Referring to FIGS. 8A and 8B, the knife 71 is shown to be constituted by a serrated-edge blade extending lengthwise of the sealing member or jaw 17b in a slot 191 in the jaw 17b. The knife is mounted at its ends beyond the ends of the jaw 17b on brackets 193 at the ends of a crossbar 195 pinned as indicated at 197 and 199 on the ends of cranks 201 and 203 pivoted at 205 and 207 on the carriage 18b. The knife 71 is actuated by an air cylinder 209 pivoted as indicated at 211 at its head end on the carriage 18b, having its piston rod 213 pin-connected as indicated at 215 to the end of the crank 203 on the other side of pivot 207 from the crossbar pivot 199, the arrangement being such that on retraction of the piston rod 213 of the air cylinder 209, the knife is moved forward out of the slot 191 and also moved lengthwise for cutting through the seal S with a slicing action, and on extension of the piston rod 213 the knife is retracted back into the slot 191 (to the position in which it is illustrated in FIGS 8A and 8B).

The jaw 17b may conveniently be made in two pieces, an upper piece 217 and a lower piece 219, these pieces being carried by the carriage 18b vertically spaced to provide the slot. Similarly jaw 17a may be made in two pieces, an upper piece 221 and a lower piece 223, these pieces being carried by the carriage 18a vertically spaced to provide the slot 73. The slots 191 and 73 are coplanar so that when the jaws 17a and 17b are closed, and the knife is driven out of slot 191 in jaw 17b, it enters slot 73 in jaw 17a.

The air cylinder 209 for actuating the knife 71 is under control of a suitable air valve 225, more particularly a solenoid valve, which is in turn under control of the programmable control 35 and means indicated generally at 227 in FIGS. 8B, 9 and 10 for sensing movement of the sealing members or jaws 17a and 17b to closed position. This means comprises a proximity switch, more particularly a magnetic switch 229, mounted on a bracket 231 on the frame 91 of the machine, and means responsive to movement of the jaws 17a and 17b to closed position for actuating the switch, the latter means comprising a permanent magnet 233 on an arm 235 on the shaft 101, with the arrangement such that when the jaw-actuating piston rod 93 is retracted to turn shaft 101 (counterclockwise as viewed in FIGS. 9 and 10) to move the jaws toward their closed position, magnet 233 moves with the arm 235 through an arc (90°) to bring it into switch-actuating end-to-end alignment with switch 229 at one end of the latter. If the jaws do not reach the fully closed position for sealing the tubing, the magnet 233 does not reach the position for actuating the switch 229, and it remains deactuated.

The switch 229 is functionally interconnected as diagrammed in FIG. 11 with the programmable control 35 and the solenoid valve 225. In normal operation of the apparatus, i.e. complete closure of the sealing jaws 17a and 17b on the tubing T to form a seal S, arm 235 swings counterclockwise as viewed in FIGS. 9 and 10 with shaft 101 to bring magnet 233 into switch-actuating position with respect to the magnetically actuated switch 229 to actuate the latter, enabling energization of valve 225 with the jaws closed to actuate the knife air cylinder 209 to actuate the knife to cut through the seal S.

If, however, jaws 17a and 17b do not reach their fully closed position and thereby fail to form a seal S across the tubing, arm 235 does not swing far enough counterclockwise to bring magnet 233 into switch-actuating proximity to switch 229. The latter, accordingly, remains deactuated to inhibit operation of the knife. The programmer 35 effects opening of the jaws 17a and 17b and the apparatus progresses through another cycle, resulting in the tubing T being fed downwardly another package length increment so that a double length of tubing L2 (FIG. 5) extends down below the level of the jaws 17a and 17b. Then, the jaws close and, assuming they close all the way, they form a seal S at the top of the double length L2 to form the double-length package 2P. The knife 71 operates to cut through this seal S, and on the subsequent opening of the jaws in the course of the cycling of the apparatus, this double-length package drops away. It will be noted that this package is sealed at the top, and hence none of the product is spilled.

Figure 12:
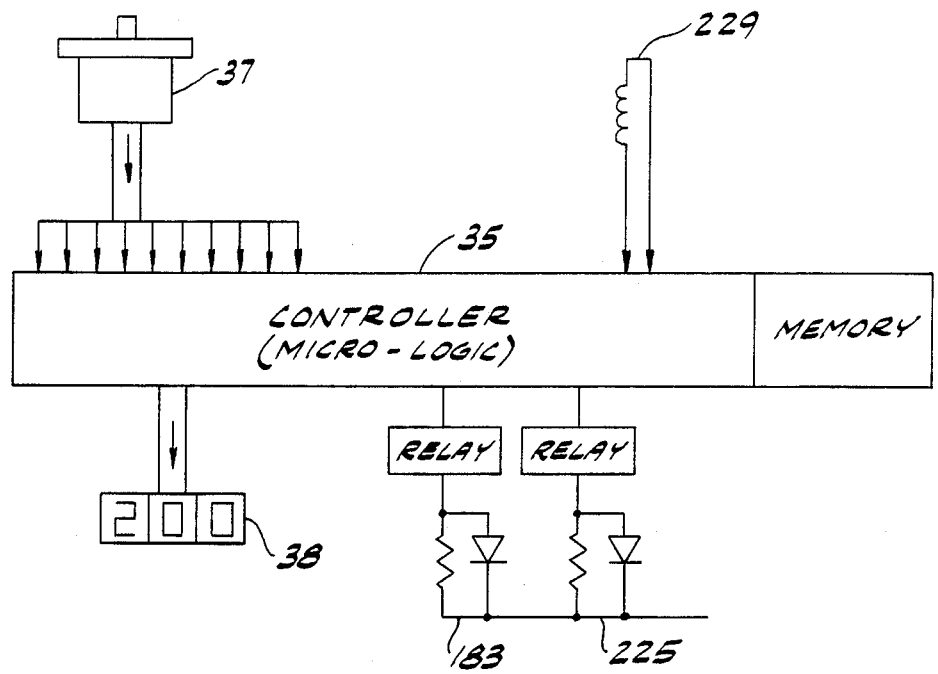
FIG. 12 is a block diagram of the programmable control circuit input and output to the packaging machinery.

As previously mentioned, the programmable control means 35 monitors the position in the cycle of the machine through input from the encoder 37 (FIG. 12). Also, the control 35 has a memory in which is stored the closing position of jaws 17a and 17b as signalled by proximity switch 229. Further, control 35 can be pre-programmed to add increments to this stored value in order to provide a new predetermined position in the machine cycle within which activation and closure of the jaws must occur in order for the knife to be enabled and the jaws to continue closing.

Figure 13:
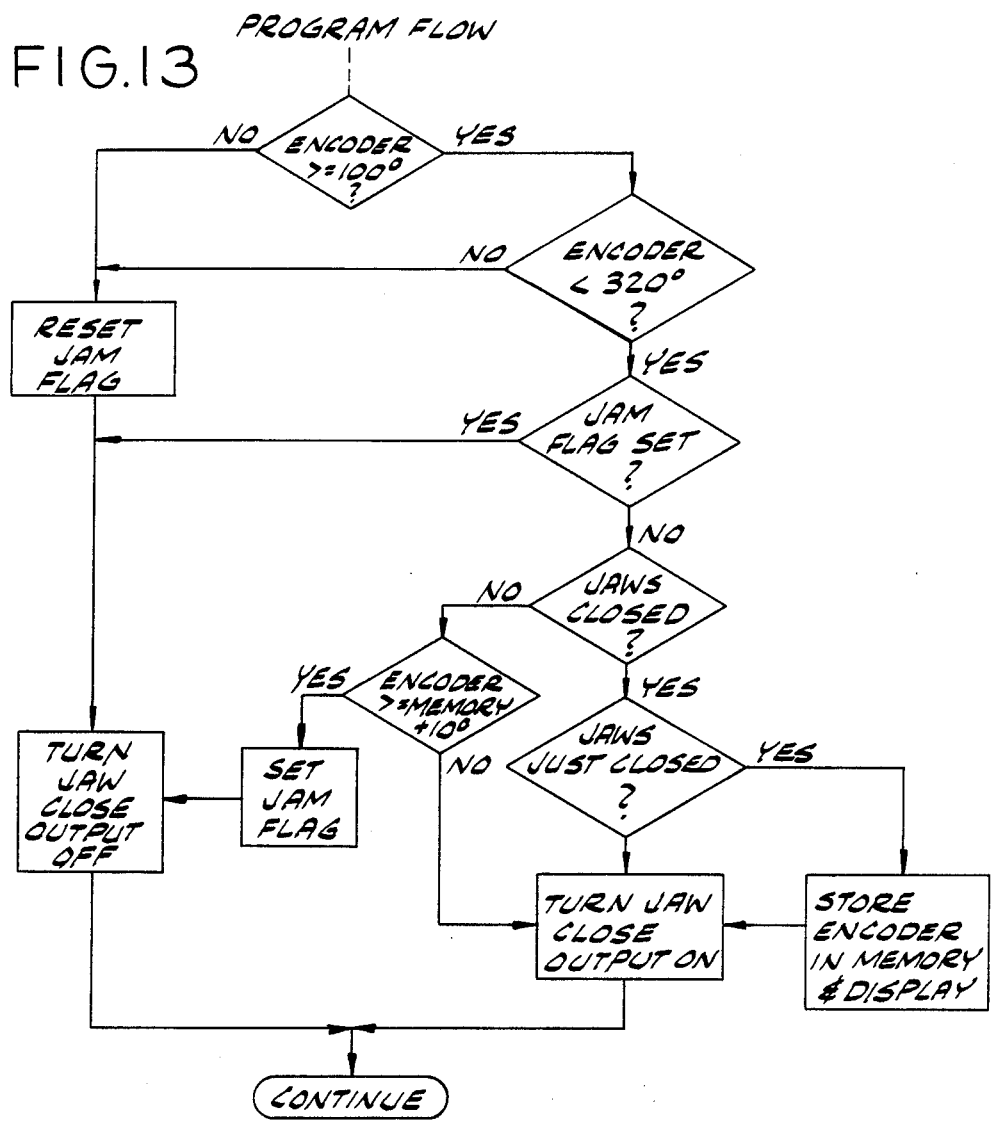
FIG. 13 is a logic flow schematic for the programmable control and its interaction with various machine functions.

These additional functions of the control means 35 can best be explained in connection with the flow diagrams of FIGS. 13 and 14. The programmable controller 35 senses the various conditions, as indicated in the program flow of FIG. 13, and determines the choices of machinery function based upon the input. The control 35 can be adjustably preset to prevent operation of the jaws 17a and 17b within a given range of machine cycle degrees.

For example, the operation of the jaws can be preset to be permitted in the range of 100° to 320°. The encoder 37 input to the control means 35 indicates the position and machine cycle degrees that the machine is currently at. The initial decision of control 35 is to determine whether or not the machine cycle is greater than or equal to 100°. If it is not, the control 35 will prevent operation of the jaw closing mechanism. If the encoder 37 indicates greater than or equal to 100° of machine cycle, the control will next determine whether or not the position in the machine cycle is greater than or equal to the upper limit of the range of, for example, 320°. If the machine cycle is greater than 320° it will continue to inhibit or prevent function of the jaw closing mechan- If, on the other hand, the encoder indicates that the machine is currently within the range of 100° to 320°, it will then determine whether or not a jam flag has been set on a previous cycle. If it has, it will continue to turn the jaw close output off preventing closure of the jaws regardless of encoder position If it has not, the control will then interrogate as to whether or not the jaws are closed. This interrogation wil continue for the period from which the jaws are initially activated to close until actually closed as indicated by the proximity switch 229. During this time, the control 35 will consider whether or not the encoder 37 is showing a position in the cycle greater than or equal to the memory number plus a predetermined amount, for example, 10° as shown in FIG. 13.

If the machine has not yet reached this predetermined position in the machine cycle, it will continue to close the jaws. However, if at this juncture it indicates that the encoder 37 is showing a position in the machine cycle greater than or equal to memory plus 10° it will set the jam flag and stop movement of the jaws, since if the jaws are not closed by the memory position plus 10° it is likely because something is jamming the jaws and they should not be allowed to close.

The control 35 also continues to monitor after the jaws close interrogation, whether or not the jaws have just closed, i.e., whether or not this is the first signal from switch 229 in the interrogation or whether previous signals have been sent indicating that the jaws are closed. This feature is necessary since it is only desirable to place in memory and on display 38 the position in which the jaws first close. Thus, if after the interrogation this is not the first signal of the jaws being closed the cycle position will not be stored in memory and the control 35 will continue to turn the jaw close output on to maintain the jaws closed.

Figure 14:
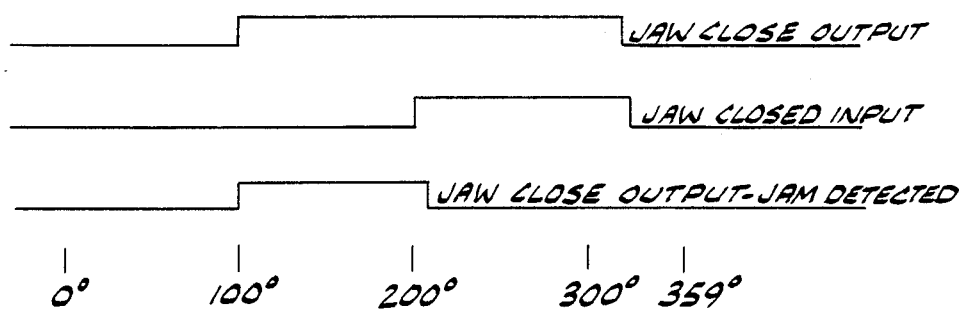
FIG. 14 is a relative timing chart illustrating the occurrence of various jaw movements at varying points in the machine cycle.

With reference to FIG. 14, further explanation of the cycle can be provided by a comparision of the relative timing in the machine cycle of the jaw closed signal, and a jam detection during the jaw closed output. Normally, the cycle of jaw close output will appear as the top line chart in FIG. 14 where the stepped up portion between 100° and 320° is the normal operating range of the jaw close output in which the jaw closing mechanism is actuated. In this illustration, the second line shows that the jaws actually closed at approximately 200° and remain closed through approximately 320°. On the other hand, if a jam occurred early in the cycle the jaw close output would be deactivated, as here illustrated for example at slightly greater than 200°, and would remain deactivated for the remainder of that cycle.

It is to be remembered that an important feature of the invention is that the immediate previous jaw closed point is noted and stored in the memory of control 35 to be used as the predetermined position for cutoff in the subsequent machine cycle in combination with a slight tolerance of, for example, plus 10°, to allow for some variation in the time it takes to close the jaws. It is to be pointed out that since the jaws close point is unknown on the first cycle, it can be assumed to be, for example, 300°. Thus, so long as the jaws close prior to 300° on the first cycle, no jam detection action is taken.

Assuming then, for the sake of example, that on the first cycle the jaws actually close at 270°, the memory will store the 270° plus 10 so that on the subsequent cycle the jaws must indicate closed by 280°. The same sequencing of the predetermined position in the machine cycle at which the jaws must be closed or the jaw closure mechanism will be inhibited, continues on each subsequent cycle. Thus, as a machine starts up cold and progresses to warm up the machine parts, the cycle time can be reduced and the inhibiting feature automatically closed in on the "window" to maintain a consistent monitoring of the closure cycle for the jaws to indicate if it is then extending substantially beyond the previous cycle's time.

Although the present invention has been described as being utilized to inhibit the closing of the jaws, the same monitoring system can be utilized to inhibit functions of other portions of the equipment, such as the knife or heating element in the jaws which produce the sealing feature.

Additionally, the sensing of the jaw's closed position can be used as a target value for sealing purposes. If it is desired to see the jaws closed at, for example, 225°, the jaw close initiation point can be computer adjusted either earlier or later to target the jaw closure at exactly 225°. The jaw closed jam detector will then consistently be set to have the jaws closed by 235° (225° + 10°). This will assure constant jaws closed dwell in spite of varying jaw close parameters.

In view of the above, it will be seen that the several objects of the invention are achieved and other advantageous results attained.

As various changes could be made in the above constructions and methods without departing from the scope of the invention, it is intended that all matter contained in the above description or shown in the accompanying drawings shall be interpreted as illustrative and not in a limiting sense.

What is claimed is:

1. The method of controlling packaging machinery which forms containers of flexible packaging material through cyclical operations, comprising the steps of:
   moving sealing members between an open position out of engagement with the packaging material and a closed position engaging the packaging material so as to produce a seal therein;
   monitoring whether or not the sealing members have moved to the closed position from the open position;
   comparing the position of closure of the sealing members, with a predetermined position within the cycle;
   continuing movement of the sealing members toward the closed position as long as the position in the cycle is prior to the predetermined position, otherwise inhibiting further movement of the sealing members toward the closed position;
   sensing movement of the sealing members into the closed position;
   noting the position of the machine cycle at which the sealing members reach the closed position; and
   adjusting the predetermined position in the machine cycle prior to which the next subsequent movement of the sealing members from open to closed positions must be initiated and completed to prevent inhibiting of further movement of the sealing members toward the closed position, said adjustment being based on the previously noted position with respect to the immediate prior machine cycle.

2. The method of claim 1, including after said step of sensing movement of the sealing members into the closed position, the steps of:
   initiating movement of a cutting member into said packaging material to sever the same at a predetermined location; and
   withdrawing said cutting member and returning said sealing members to the open position to begin the next machine cycle.

3. Apparatus for controlling packaging machinery which forms containers of flexible packaging material through cyclical operations, comprising:
   a pair of sealing members;
   means for moving the sealing members between an open position spaced from one another and out of engagement with the packaging material, and a closed position engaging the packaging material therebetween for producing a seal therein;
   means for monitoring whether or not the sealing members have moved to the closed position from the open position, said monitoring means also monitoring and comparing the position in a machinery cycle of closure of the sealing members with a predetermined position within the cycle, and for inhibiting further movement of the sealing members toward the closed position if beyond the predetermined position within the cycle, said monitoring means also monitoring the position in the machinery cycle at which the sealing members reach the closed position and adjusting the predetermined position in the machinery cycle prior to which the next subsequent movement of the sealing members must be initiated and completed to prevent inhibiting of further movement of the sealing members toward the closed position, said adjustment being based on the previously noted position of the immediate prior machine cycle.

4. Apparatus as set forth in claim 3, including:
   cutting means for severing the packaging material in the area of the seal formed by the sealing members;
   said monitoring means also inhibiting the cutting means from severing said packaging material if said sealing members are not in said closed position prior to said predetermined position in the machinery cycle.

5. Apparatus as set forth in claim 4 wherein said monitoring means provides a visual display in machine cycle degrees of the sealing members closed position.

6. Apparatus as set forth in claim 3 wherein said monitoring means adds a predetermined interval to the sealing members closed position of the immediate preceding machine cycle to establish the predetermined position for the subsequent cycle.

7. Apparatus as set forth in claim 3, wherein said means for moving the sealing members is controlled by said monitoring means so that the point in the machinery cycle at which movement of the sealing members from the open position toward the closed position is initiated can be preset in said monitoring means.

* * * * *